July 7, 1964
W. B. HATCH
3,140,436
CONTROL SYSTEM FOR AUTOMATIC PILOT
Filed Nov. 20, 1961
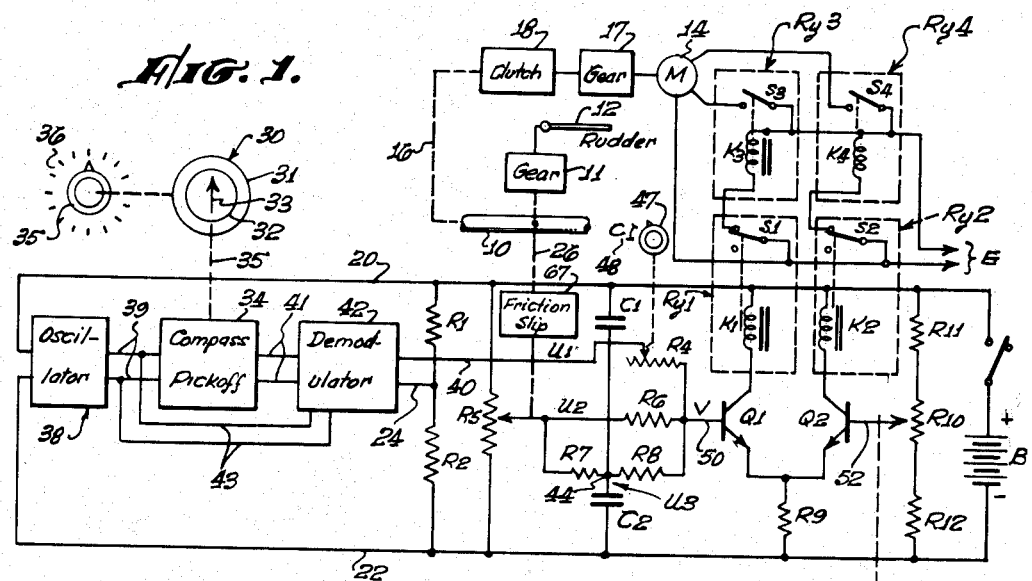
FIG. 1.
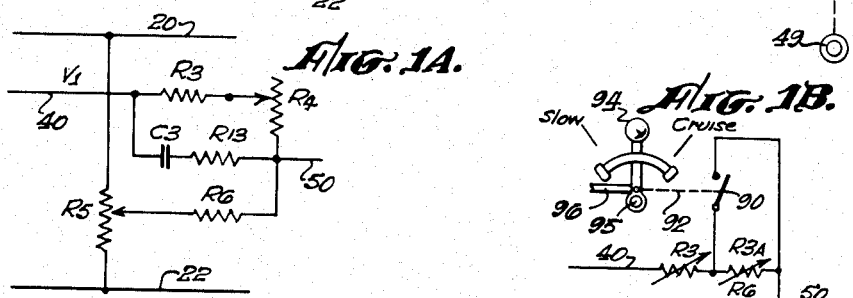
FIG. 1A.
FIG. 1B.
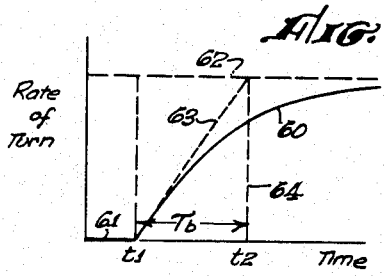
FIG. 2.
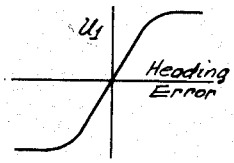
FIG. 3.
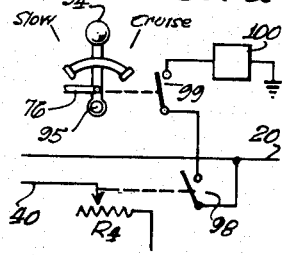
FIG. 1C.
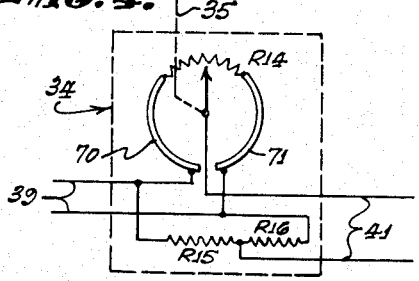
FIG. 4.
WILLIAM B. HATCH,
INVENTOR.
BY
Barkalow & Lewis

United States Patent Office 3,140,436
Patented July 7, 1964

3,140,436
CONTROL SYSTEM FOR AUTOMATIC PILOT
William B. Hatch, Santa Barbara, Calif., assignor, by mesne assignments, to Swedlow Inc., Los Angeles, Calif., a corporation of California
Filed Nov. 20, 1961, Ser. No. 153,438
10 Claims. (Cl. 318—489)

This invention has to do with mechanism for automatic control of the helm of a steerable vehicle, such as a small boat, for example, for maintaining a predetermined heading or course.

The invention relates more particularly to control mechanism, whereby a heading error signal of essentially continuously variable type is utilized to control the helm with improved smoothness and efficiency.

In accordance with one aspect of the invention, a second signal is developed which continuously represents the helm deflection from its normal position amidships. The rudder signal is then summed with the heading error signal with proper regard for polarity so that the signals tend to cancel when the rudder deflection is in a direction to correct the heading error. The helm is driven positively in a direction to reduce the signal sum. That procedure has the great advantage of continuously defining a rudder position that corresponds directly to the heading error and produces equilibrium of the control system. The corrective action is maintained in direct relation to the magnitude of the heading error.

The invention further provides particularly convenient and effective overall gain control for varying the size of the rudder deflection that corresponds to a given heading error. That control is such that during normal operation the maximum helm deflection is positively limited to a moderate value. Even a large heading error then cannot produce so large a rudder deflection as to be uncomfortable for the crew or damaging to the steering mechanism. Nevertheless, when higher gain control is required, as when operating at greatly reduced speed, for example, the maximum available rudder deflection is automatically increased along with the gain at small deflections. A further aspect of the invention provides automatic variation of the gain control and maximum rudder displacement by control of the engine throttle.

In accordance with a further aspect of the invention, the signals representing heading error and helm deflection angle are summed with a third signal that represents the rate of change of heading, or rate of turn of the boat. The rate of turn signal is added with such polarity that when the rate of turn is in a direction to reduce the heading error the rate of turn signal opposes the heading error signal, thereby reducing the rudder angle that is required to balance the control system. I have found that when an accurate rate of turn signal of adequate relative magnitude is included in the control system it is possible for an automatic pilot system to correct even large heading errors rapidly and without appreciable overshoot.

A rate of turn signal can be developed in principle by differentiating the heading signal. Whereas a rate of turn signal developed in that manner is satisfactory in many respects, it involves a number of difficulties. In particular, it is often desirable to develop the heading error signal by means of a compass-driven transducer having relatively high intrinsic impedance; and the component values then required to differentiate the signal with suitable time constant may become prohibitive unless additional circuit complications are introduced. Also, a differentiating circuit is in the nature of a high-pass filter, and transmits any high frequency noise that is present in the heading error signal. That is particularly unsatisfactory in an auto-pilot system for a boat, since even a well-designed and constructed compass develops considerable instability in a heavy sea.

I have discovered that a highly satisfactory rate of turn signal can be derived in a simple and reliable manner directly from the helm shaft itself. That completely avoids any limitations associated with the compass structure or compass transducer. In particular, a transducer of low impedance type can be coupled to the helm shaft and can provide ample power to operate passive circuitry of substantially any desired type without special amplification. A special transducer is not required, since the rate of turn signal can be derived from the output of the same transducer that develops the rudder position signal.

A particular advantage in developing the rate of turn signal from the helm shaft is that the transformation required is in the nature of integration, rather than differentiation. Integration corresponds generally to a low pass filter, and the resulting rate of turn signal therefore tends to have eliminated from it any erratic variations that may exist in the actual helm shaft movement. Hence any such noise components tend to be damped out by the system, leading to remarkably smooth and efficient control action.

The possibility of deriving a rate of turn signal from the rudder position results from the fact that deflection of the rudder from zero position produces a torque which in turn produces an angular acceleration of the boat inversely proportional to the boat's moment of inertia. By integrating that acceleration, one can obtain an approximate representation of the rate of turn. However, I have further discovered that a true integration of the rudder position does not give a fully satisfactory representation of the rate of turn. That is due to the important role played by viscous friction of the water in damping the turning movement of a boat. In particular, if the helm is shifted abruptly from amidships to a definite deflection angle, the boat typically responds initially with a corresponding angular acceleration. However, the rate of turn approaches a maximum value at which the available rudder torque is all expended in overcoming viscous and reliable representation of the actual rate of turn of sible to derive from the rudder position a very accurate and reliable representation of the actual rate of turn of a boat by means of remarkably simple mechanism which is describable in electrical terms as an R-C low pass filter having a definite time constant suitably related to the dynamic characteristics of the boat.

The invention further provides convenient and effective means for varying the effective gain of the control action. That is typically accomplished by adjustment of the relative amplitude with which the various signal components are combined to produce an overall control signal. More particularly, if the control signal is considered as a linear combination of the several signal components with normally constant coefficients, the gain is adjusted by varying the relative magnitude of the coefficients, particularly for the rudder position signal and heading error signal. In preferred form of the invention, the gain is varied by changing the coefficient with which the heading error signal is summed. As the heading error signal coefficient is increased, the response of the system to a given heading error is correspondingly reduced.

The invention further provides particularly convenient and effective adjustment of the exact rudder position that is maintained under equilibrium conditions of the system. Moreover, that adjustment is not affected when the gain of the system is changed. Such adjustment of the zero rudder position is desirable to produce accurate dynamical balance of the overall system to compensate for variation of any condition tending to turn the boat in one direction or the other. Such conditions include for example, beam winds, imperfect engine balance in twin-screw boats and varying engine speed in single screw boats. By adjusting the zero rudder position to compensate existing conditions of that type, the right and left corrective actions of the system can be accurately balanced, greatly reducing the overall frequency of such actions and improving accuracy.

A full understanding of the invention, and of its further objects and advantages, will be had from the following description of a preferred manner of carrying it out. The particulars of that description, and of the accompanying drawings which form a part of it, are intended only as illustration of the invention, and not as a limitation upon its scope, which is defined in the appended claims.

In the drawings:

FIG. 1 is a schematic drawing representing an illustrative electrical circuit system in accordance with the invention;

FIG. 1A is a fragmentary schematic drawing correspondnig to a portion of FIG. 1 and representing a modification;

FIG. 1B is a fragmentary schematic drawing corresponding to a portion of FIG. 1 and representing a further modification;

FIG. 1C is a fragmentary schematic drawing corresponding to a portion of FIG. 1 and representing a further modification;

FIG. 2 is a graph illustrating properties of certain time constants;

FIG. 3 is a graph illustrating a preferred relation between heading error and the signal representing heading error; and FIG. 4 is a schematic drawing representing illustrative structure of an element of FIG. 1.

An illustrative automatic pilot system in accordance with the invention is represented schematically in FIG. 1. The helm shaft of a boat or other vehicle is indicated schematically at 10, coupled to the rudder 12 via conventional speed reducing mechanism 11. The helm shaft and rudder are driven by the reversible helm motor 14 via coupling mechanism represented schematically by the dashed line 16. Coupling 16 typically includes a suitable reduction gear 17 and a clutch mechanism 18 whereby motor 14 may be disconnected from the helm shaft, as to facilitate manual steering.

Motor 14 may be of electric, hydraulic or other type, and may be controlled by either positive or proportional control mechanism as preferred. An advantage of the present control system is that effectively accurate and smooth control is obtainable with positive motor control, and that type of control will be illustratively described. As shown, direct current power from a source E is supplied to motor 14 by actuation of one or other of the power relays Ry3 and Ry4 to drive the helm shaft in a direction to produce right or left rudder deflection, respectively. Those relays or motor actuators are controlled by the relatively sensitive relays Ry1 and Ry2, respectively, whose normally closed switches S1 and S2 are connected in series between source E and the respective power relay windings K3 and K4. The sensitive relay windings are shown at K1 and K2, connected in the control circuit to be described.

It will be recognized that relays Ry1 and Ry2 may be replaced or supplemented, if desired, by amplifying devices of many different types, such as transistors, for example. Also, power relays Ry3 and Ry4 are intended to represent motor actuators of any desired type. In particular, motor 14 may be a hydraulic motor controlled by solenoid actuated valves of conventional type.

As illustrated, the various elements of the control system receive electrical power from a direct current voltage source represented as the battery B via positive and negative bus lines 20 and 22. A signal ground line 24 is set at an intermediate voltage, preferably midway between lines 20 and 22 by the voltage dividing resistances R1 and R2. Battery B and power source E may constitute a single power supply, and may be part of the regular power system of the boat. One of the lines 20 and 22 is then typically grounded, but voltages in the present system will be considered relative to the signal ground of line 24.

A primary control signal U1 for controlling helm drive 14 is derived from a compass, gyro, or other direction sensitive device and represents the heading error of the boat. As illustratively shown, the compass assembly 30 comprises a housing 31, which is rotatably adjustable relative to the boat in accord with the desired heading or course, as by the manual knob 35 and heading scale 36. Housing 31 contains the usual compass card 32, positioned relative to magnetic north by a suitable magnet 33. A compass transducer 34 is mounted in housing 31 and driven by relative rotation of compass card 32, as indicated schematically by the line 35. When the boat's heading corresponds to the setting on scale 36, the compass card is aligned with the case, and the transducer is arranged to produce zero output signal under that condition. When the compass is deflected from zero, the signal amplitude represents the magnitude of the heading error, while the sense of the error is typically represented by the polarity or the phase of the signal. The transducer itself may be of any suitable type, including, for example, electrical, electromagnetic, photoelectric and the like.

The transducer may directly produce a direct current signal, as in the case of a photovoltaic cell, for example; or may be excited with direct current power. In the present illustrative system compass transducer 34 is excited with an alternating current carrier, and the resulting alternating current signal is demodulated with attention to the phase to produce a final direct current heading error signal U1 on the line 40. The alternating current power is produced typically by an oscillator, which may be of conventional type and may, for example, produce either a sinusoidal or an essentially square waveform. Such an oscillator is indicated schematically at 38. Oscillator 38 may be designed to produce alternating current of any desired frequency, typically a few kilocycles per second. The alternating current signal from compass transducer 34 is demodulated by the phase sensitive detector 42, which may be of conventional type. It receives a phase reference signal via the lines 43 from oscillator 38. Demodulator 42 may also include one or more stages of amplification, typically using vacuum tubes or transistors in conventional manner. The resulting signal U1 on line 40 is a direct current voltage the magnitude and polarity of which with respect to signal ground on line 24 represent the size and direction of the existing heading error. That signal is transmitted to the line 50 via the variable resistance R4, which is controllable manually by the knob 47 to modify the gain of the system.

Two additional control signals are supplied to line 50 via the resistances R6 and R8, respectively, and the resulting voltage signal V, representing the sum of three distinct components, is supplied as input to suitable discriminating, amplifying and control circuits. As shown, those circuits comprise the transistors Q1 and Q2 and the relays already described. It will be convenient to describe the transistor action before explaining more fully the nature of the composite input signal.

The two transistors Q1 and Q2, which are preferably of the same type and closely matched, are connected in a discriminating circuit with common emitter resistance R9 and respective equal collector load impedances, which are typically approximately equal to the resistance of R9. Those impedances may develop signals for supply to additional amplifying stages. As shown, however, they comprise the relay windings K1 and K2. The control signal on line 50 is supplied directly to the base of Q1; and the base of Q2 is fixed at a definite but adjustable reference potential via the line 52 and the potentiometer R10, which forms a voltage divider with R11 and R12 and is adjustable by the manual knob 49.

Under equilibrium conditions lines 50 and 52 are at equal potentials and Q1 and Q2 conduct equally. The currents through K1 and K2 are then held at equal values, just sufficient to actuate the respective relays Ry1 and Ry2, deenergizing the power relays Ry3 and Ry4 at the open switches S1 and S2. If the signal on line 50 rises above reference potential 52, Q1 conducts more heavily, increasing the voltage drop in R9 and tending to cut off Q2. The current through K1 then increases while that through K2 decreases. A decrease in signal voltage at 50 produces the opposite response. The component values are so selected that even a slight change of the signal V deenergizes one or other of the relays Ry1 and Ry2, energizing the corresponding power relay. That action causes helm motor 14 to drive at substantially full speed in one direction or the other, according as the signal potential on line 50 is higher or lower than the reference potential at 52. The sense of the electrical and mechanical connections is so arranged that, if the signal deviation is due to compass signal U1, the direction of helm drive is such as to correct the heading error represented by that signal.

The described relay arrangement has the advantage that the circuit action is not critically dependent on the condition of adjustment of the relays Ry1 and Ry2. In particular, application of abnormally high voltage for any reason to relays Ry1 and Ry2 does not cause malfunction of the system; and the current drain on starting of motor 14 does not tend to turn the motor off, even when the motor and control system utilize a common power source.

We return now to the signal components other than U1 on line 50. Helm shaft 10 and rudder 12 are coupled to a transducer which produces a signal essentially proportional to the angular rudder deflection from a zero position. That transducer, which may be of any suitable type, is shown as the potentiometer R5, which is supplied with direct current reference voltage from bus lines 20 and 22 and has its wiper coupled to helm shaft 10 via suitable mechanism represented schematically at 26. The signal produced at the wiper of R5 is designated U2 and will be referred to as the rudder position signal. It is transmitted via the resistance R6 to line 50, where it is effectively summed with compass signal U1.

The third signal supplied to line 50 is so derived that it represents the rate of change of the boat's heading. Such a signal may be obtained, for example, by tapping compass signal U1 from line 40 and passing it through a differentiating circuit. To obtain an accurate representation of the derivative of U1, such a circuit must include an active element such as an operational amplifier. A relatively simple RC lead circuit is shown illustratively in fragmentary form in FIG. 1A. That circuit comprises the capacitance C3 and the resistance R13, series connected between line 40 and line 50. With suitable selection of the components, that circuit delivers to line 50 a signal roughly approximating the derivative of U1 with respect to time. Such a signal may be used as a rough approximation of the rate of change of the heading, or the rate of turn.

In accordance with a further aspect of the present invention, the rate of turn signal U3 is preferably not derived from compass signal U1, but is derived instead from a representation of the rudder position such, for example, as rudder position signal U2. I have discovered that a rate of turn signal can be derived from U2 or from a corresponding signal by a remarkably simple circuit means, yet with high accuracy and reliability. Such derivation is accomplished in the system of FIG. 1 by the low pass R-C filter network 46, typically comprising the two equal series resistances R7 and R8 and the equal parallel shunting capacitances C1 and C2. R7 and R8 are typically equal to each other, and are preferably large compared to R5 and considerably smaller than R6, so that the effect of the latter resistances on the time constant of network 46 is minor. Capacitances C1 and C2 are connected between the junction 44 of R7 and R8 and the respective busses 20 and 22 in order to maintain symmetry about signal zero. The filter circuit shown is illustrative of circuit means having a signal transfer function of the form $$G(s) = \frac{1}{1+s\tau}$$

in the conventional notation of servo theory, where $\tau$ represents a time constant. The time constant $\tau$ for the particular T configuration filter shown equals the product of one of the resistances in ohms by one of the capacitances in farads. Many other known circuit configurations have transfer functions of substantially equivalent type, with definite and known time constants $\tau$.

To provide the required transfer function, the time constant $\tau$ for the filter circuit must correspond properly to the dynamic characteristics of the boat on which the automatic pilot is to be used. That correspondence need not be precise, but unless it is reasonably close the performance of the system is less than optimum.

More exactly, the filter time constant $\tau$ is preferably made approximately equal to a particular time constant for the boat. The latter constant $\tau_b$ is a function of the moment of inertia of the boat and of the viscous damping that resists turning, and represents the time constant with which the boat responds to an abrupt shift of helm. In practice, the time constant $\tau_b$ for the boat can be obtained empirically by abruptly shifting the rudder from amidships to a fixed angle, and determining the quotient of the rate of angular acceleration with which the boat initially responds to the shift of helm divided by the maximum rate of turn produced by the imposed helm angle.

The relations just described are illustrated graphically in FIG. 2, which is a plot of rate of turn against time. The rudder is assumed in zero position until time $t1$, producing zero rate of turn as indicated by the line 61. At $t1$, the rudder is abruptly shifted to a definite angle, at which it is then held. The resulting torque causes the boat to turn with an angular acceleration that is initially constant, represented by the slope of the initial part of line 60. However, as more energy is consumed by the water resistance, the acceleration decreases toward zero, and the rate of turn asymptotically approaches a definite maximum that corresponds to the rudder position and is represented by the horizontal line 62 in FIG. 2.

The line 63 in FIG. 2 is drawn tangent to the initial, substantially straight portion of line 60, and is projected to intersect line 62. That intersection defines a time, indicated by the line 64 and denoted $t2$. The time constant $\tau_b$ for the boat then corresponds to the time elapsed between $t1$ and $t2$. In practice the line 60 can be constructed by directly observing the boat's response to a sudden shift of rudder angle; and the time $\tau_b = t2-t1$, can be computed graphically from the curve in the manner described. It is found in general that the value obtained for $\tau_b$ depends only slightly upon the magnitude of the helm shift employed. If that dependence is unusually large, it is preferred to adopt a value derived from a moderate angular shift of rudder such as 5°, for example. Evaluation of $\tau_b$ can also be made by holding a fixed rudder deflection until an equilibrium condition is established and then returning the rudder abruptly to zero position. A graphical construction and computation corresponding to that of FIG. 2 can then be made, and will ordinarily give essentially the same time constant.

The resistances R4, R6 and R8 represent an illustrative summing circuit, whereby signals U1, U2 and U3 are summed algebraically with definite respective coefficients to form a linear combination or composite control signal V on line 50. That summation may be represented as $$V = U1' + U2' + U3' = aU1 + bU2 + cU3$$

where $a$, $b$ and $c$ are the coefficients or weighting factors by which the respective individual signals are effectively multiplied to give the actual components of the composite signal V. The desired relative values of those coefficients are obtained by selection of suitable component values, particularly the effective resistance values of the summing networks. It will be appreciated that increasing one of the coefficients has essentially the same effect upon the performance of the system as decreasing the other two, since the absolute magnitude of the signal sum can be amplified or attenuated as desired by conventional means.

Each of those resistance values is preferably high compared to the source impedance of the signal supplied to it, thereby providing effective mutual isolation of the respective signals. If more complete isolation is desired, summing circuits of more elaborate type may be employed, and isolating means such as transistors may be provided in known manner. Many different types of summing circuit are well known and need not be described in detail here. It will be noted, however, that summation in the present sense includes both addition and subtraction, in the narrow sense of those terms. If one signal is inverted and subtracted from the other the result is equivalent to adding the signals. Hence differential amplifiers, for example, are useful for the present type of signal summation. In fact, the present type of transistor or circuit may be employed as a differential amplifier for that purpose. For example, heading error signal U1 may be supplied, after variable attenuation, to the base of transistor Q1; and the sum of U2 and U3 may be supplied to the base of Q2 in place of the present bias voltage from R10. The overall signal sum then appears in the circuit as the voltage difference between the two transistor collectors, and that voltage difference causes the differential relay energization that controls the motor drive.

For the present purpose high precision in the summing circuits is ordinarily not essential, and complete mutual isolation of the signals to be summed is not usually required. Hence the present summing resistances may even be of the same order as the signal source impedances. In fact, when the impedance looking toward the signal source is suitable, it may act as adding resistance. It is then unnecessary to provide a specific summing resistance or other circuit device. And in calculating the coefficients $a$, $b$ and $c$, the source impedances as well as the specific adding circuits must often be taken into account for maximum accuracy.

The present illustrative summing circuits have the advantage of great simplicity. Moreover, the relative importance of the respective components in the final sum can readily be controlled, as by variation of the summing resistors. In particular, in the present circuit R4 is variable, providing convenient adjustment of the ratio of coefficient $a$ to $b$ and $c$. R4 thus performs a dual function, as will be more fully described. The resistor R8 also performs a filtering function in addition to its role of summation. Provision may be made, if desired, for convenient variation of the relative magnitudes of coefficients $b$ and $c$. In practice it is ordinarily sufficient to select initially component values that provide adequate amplitude of U3′, together with the proper time constant as already described, to produce stable action of the control system. If the coefficient $c$ is too large and hence the signal component U3′ is too small relative to the other signal components, corrective action by the control system tends to cause the boat to swing toward the correct heading too fast and overshoot. With the opposite condition, the corrective action becomes sluggish, and the boat approaches the correct heading unnecessarily slowly, but without instability. The action is ordinarily satisfactory when the rate of turn signal component U3′ for a given rate of turn equals from one to three times the rudder signal component U2′ for the rudder deflection that, if held, leads to that rate of turn. In the present illustrative circuit, that condition is satisfied, for example, if the sum of resistances R7 and R8 is in the range between R6 and one third of R6. That range, however, is intended only for illustration, since many advantages of the invention are obtainable outside of that range.

In overall operation of the described system, if the rudder and rate of turn signals are initially zero the system remains idle with the rudder at a definite zero position such that the rudder signal component U2′ on line 50 equals the reference voltage tapped on line 52 from R10. Hence the equilibrium or zero rudder position is conveniently adjustable by manipulation of knob 49, or any equivalent circuit modification. Moreover, that adjustment does not affect other characteristics of the system, and is not affected by other system adjustments, such as gain adjustment R4, for example.

If, for any reason, the heading error signal becomes large enough to unbalance the differential amplifier Q1, Q2 beyond a definite threshold, one or other of relays Ry1 and Ry2 is deactuated, energizing motor 14 in the corresponding direction. The helm is thereby driven substantially immediately to such a position that rudder signal component U2′, delivered via R6 to line 50, compensates the helm error signal component standing on that line, thereby rebalancing the circuit Q1, Q2 and idling the motor.

For clarity of description it will be assumed that the initial heading error appeared as a large step function, as would result from a sudden change in the desired course setting at knob 35, for example. Under that condition the initial shift of helm is correspondingly large. It causes the boat to swing with gradually increasing velocity in a direction to correct the heading error. At the same time, the rudder signal voltage U2 gradually charges capacitances C1 and C2 via resistance R7 and, to a lesser extent, via R6 and R8. The resulting potential at junction 44 is transmitted via R8 to line 50, where it appears as signal component U3′. That increasing signal soon overcompensates the heading error signal component U1′, particularly since U1 is gradually decreasing in response to the helm adjustment. Amplifying circuit Q1, Q2 is thereby typically unbalanced in the opposite direction, driving the rudder back toward its initial position. That drive continues until rudder signal U2 is reduced to a value at which the sum of U2′ and U3′ again balances U1′.

In practice, of course, the rudder is repositioned intermittently to rebalance the system whenever the unbalance exceeds the small threshold of the amplifying and control system. The rudder positioning action is virtually continuous, and may be considered to continuously maintain zero value of the composite signal V. The entire heading error component U1′ is initially balanced by the rudder component U2′. Then U3′, as it increases, takes over an increasing portion of that balancing function from U2′. Ideally, the rudder is returned to zero position while the heading error is still appreciable, the entire heading error signal being then balanced by rate of turn signal U3′; and U3′ then decays to zero, due to discharge of C1 and C2, in exact coincidence with the decay of U1′ as the boat reaches and holds the correct heading.

When the system is properly designed and adjusted composite signal V on line 50 will be seen to represent what will be called the "steering error" existing at any given moment. In actual practice it is found to correspond closely to the steering error that is judged to exist by an experienced helmsman, who has learned to take account of the helm position and the boat's response to substantially the same extent as the present automatic pilot system.

In preferred form of the invention, heading error signal U1 increases in magnitude essentially in proportion to the heading error over an appreciable angular range of that error, which may extend to from 10 to 20°, for example, on each side of zero; and then reaches a maximum value which it essentially maintains at larger heading errors. That preferred general behavior of the heading error signal is illustrated graphically in FIG. 3. Many known transducer structures are capable of developing such a signal. An illustrative structure is shown schematically in FIG. 4, comprising a potentiometer R14 connected with resistances R15 and R16 to form a bridge network excited from lines 39. The winding of potentiometer R14 has a limited angular range on each side of the mid-range zero position; and beyond that range the wiper engages arcuate contact strips 70 and 71 which are connected to the ends of the winding. The output on lines 41 depends in the manner described upon the compass deflection, which is supplied via coupling 35. The final demodulated signal U1 on line 40 of FIG. 1 has a maximum value that corresponds to the exciting voltage on lines 39. That maximum is reached at an angular compass deflection in either direction corresponding to the angular extent of the winding R14.

Also, in preferred form of the invention the rudder position signal U2 is developed by a transducer that can follow the entire rudder deflection between the positive stops that normally limit its movement. Also, the transducer signal preferably increases continuously as the rudder turns from its normal zero position substantially to the respective ends of its range of movement. However, that relatively long range of response should be combined with sufficient sensitivity of response near zero rudder position to permit accurate positioning of the rudder in equilibrium condition of the control system. That combination of characteristics can be satisfied effectively by utilizing as rudder transducer a multiturn potentiometer which may be of conventional type and is preferably excited with the full available voltage, as indicated in FIG. 1. When driven at a one-to-one ratio by the helm shaft, a potentiometer having about ten turns typically provides sufficient travel to amply accommodate the entire range of movement of the helm shaft with some reserve travel at each end. Despite such reserve, the transducer is preferably coupled to the helm shaft via a friction slip device to facilitate rotational adjustment and to avoid damage in case of improper installation. Alternatively, the case and winding of potentiometer R5 may be mounted for rotation about its drive axis and be restrained from rotation by means of a friction slip or detent device of any suitable type. Such a friction slip device is indicated schematically at 67 in the potentiometer drive coupling, and transmits sufficient torque without slipping to maintain fixed relation between the transducer and helm shaft under all normal conditions.

Slip device 67, or its equivalent, may also be utilized for adjustably setting the rudder angle at which rudder signal U2 has any particular value, such as zero. It will be seen that such an adjustment performs the same function of producing dynamic balance, already described in connection with R10 and knob 49. Hence, if desired, line 52 may be supplied with a fixed bias, and the system may then be balanced by rotation of the case of potentiometer R5, or by differential adjustment of its drive connection to the rudder, for example.

At normal cruising speed a boat ordinarily has a maximum value of rudder deflection beyond which the response of the boat is so abrupt as to be uncomfortable and inconvenient for the passengers. In fact, too sudden a turn may even throw a passenger overboard. It is therefore important to prevent accidental rudder deflections beyond the usable maximum safe angle when at cruising speed. On the other hand, at low speeds, such as are typically used for fishing or for navigating in fog, for example, it is desirable to have available a greater range of rudder deflection.

The present invention limits the rudder deflection at cruising speed by attenuating the heading error signal by a suitable factor before summing it with the rudder position signal. The required attenuation factor is such that the attenuated heading error signal cannot exceed the rudder position signal for the maximum safe rudder deflection. For example, if the heading error signal U1 has a maximum value, as shown in FIG. 3, of 8 volts, and if the rudder signal U2 for maximum safe rudder deflection at cruising speed is 3 volts, then for cruising speed operation of the system U1 is attenuated relative to U2 to 3/8 or less of its original value before the two signals are summed or in the process of summation. That relative attenuation is produced in the present system by the adding resistors R4 and R6, the degree of attenuation varying with the adjustment of R4 by knob 47. A substantially equivalent variation in signal component ratio might be made alternatively by adjusting R6 in the opposite direction, since it is the relative attenuation of signals U1 and U2 that determines the rudder deflection for given heading error. It is usually preferable, however, to control the gain by variation of the adding circuit for U1, since the relation between U2 and U3 is then undisturbed.

It is convenient to provide a scale at gain control knob 47 which indicates the limited range of adjustment for which the above defined limitation on rudder deflection holds. Such a range is indicated schematically at 48, and is designated "C" to indicate suitability for cruising speed. Other parts of the range of gain adjustment then typically provide less than the described degree of relative attenuation of signal U1. Such settings provide greater sensitivity of response to a given heading error, and are useful when operating at reduced speed.

In accordance with a further aspect of the invention, the gain adjustment of the system is driven automatically in accordance with the engine speed. As illustratively shown in FIG. 1B, the adding resistance for signal U1 includes two series-connected resistances R3 and R3A. R3A is shunted by a switch 90, which is operated by a linkage indicated schematically at 92 under control of the engine throttle control 94. Throttle control 94 is represented as a handle pivoted at 95 and linked by the rod 96 to the engine speed control, not shown. With handle 94 in cruising position, switch 90 is open and R3A is included in the adding circuit, attenuating signal U1 relative to U2 in the manner described and thereby insuring limitation of the rudder deflection to a safe or otherwise desirable value. With speed control 94 at slow position, R3A is shorted out, increasing the sensitivity of response of the system to a value determined by R3. R3 and R3A may be made adjustable over suitable respective ranges to permit variation of the system sensitivity for the two described speed regions.

If preferred, throttle handle 94 can be coupled to a continuously variable resistance, such as R4 in FIG. 1. The linkage between the throttle control and R4 is then preferably so designed that whenever the throttle is set at cruising speed the sensitivity adjustment is necessarily within the range that is suitable for cruising, in the sense already described in connection with range "C" of FIG. 1.

An alternative arrangement in accordance with the invention for avoiding accidental excessive rudder deflection is represented schematically in FIG. 1C. A warning device is indicated at 100, and may comprise a red light, an audible alarm or the like. Alarm 100 is arranged to be actuated whenever the throttle is set in the cruising speed range and gain adjustment R4 is simultaneously set for a higher gain than is desired for use in that speed range. As illustratively shown, alarm 100 is energizable from bus 20 via the series switches 98 and 99. Switch 98 is so coupled with variable resistance R4 as to be closed whenever the gain is higher than the range "C" of FIG. 1. Switch 99 is so coupled with throttle 94 as to be closed when the throttle is in cruising speed range. An alarm of the described type is particularly useful when control of the boat is first turned over to the autopilot, since the heading error is then apt to be large. Hence it is useful to supply power to alarm 100 via the switches 98 and 99 from a source that is energized automatically before full power is supplied to the autopilot system.

I claim:

1. An autopilot system for a boat, comprising in combination
    means for developing a first signal that represents the heading error,
    means for developing a second signal that represents the rudder deflection,
    means for deriving from the second signal a third signal that represents the rate of turn of the boat,
    means for summing the signals with such polarity that the second and third signals oppose the first signal when the rudder deflection and the rate of turn are in a direction to correct the heading error,
    and means for driving the rudder in response to variations of the signal sum.

2. An autopilot system for a boat, comprising in combination
    means for developing a first signal that represents the heading error,
    means for developing a second signal that represents the rudder deflection,
    structure forming an electrical R-C low pass filter having a time constant that corresponds to the time constant with which the boat responds to a change of helm,
    means for supplying to said filter a voltage substantially proportional to the rudder deflection to produce a third signal representing the rate of turn of the boat,
    means for summing the signals with such polarity that the second and third signals oppose the first signal when the rudder deflection and the rate of turn are in a direction to correct the heading error,
    and means for driving the rudder in response to variations of the signal sum.

3. An autopilot system for a boat, comprising in combination
    means for developing a first signal that represents the heading error,
    means for developing a second signal that represents the rudder deflection,
    means for developing a third signal that represents the rate of turn of the boat,
    means for producing a control signal substantially equal to a linear combination of the said signals, the polarity of the coefficients of the linear combination being such that the second and third signals tend to cancel the first signal when the rudder deflection and the rate of turn are in a direction to correct the heading error,
    means for adjustably varying the coefficient of the first signal in said linear combination,
    and means for driving the rudder in response to variations of the control signal.

4. An autopilot system for a boat that has a normal cruising speed and has a maximum value of rudder deflection that is safely usable at said cruising speed,
    means for developing a first electrical signal that increases substantially in proportion to the heading error from zero heading error to a predetermined limiting value and is substantially constant for heading errors larger than said limiting value,
    means for developing a second electrical signal that increases substantially in proportion to the rudder deflection from zero position over substantially the entire range of rudder deflection,
    means normally acting to attenuate the first signal relative to the second signal so that after such attenuation the first signal at said limiting value of heading error is smaller than the second signal at said maximum value of rudder deflection,
    means for summing the relatively attenuated first signal and the second signal with such polarity that they oppose each other when the rudder deflection is in a direction to correct the heading error.
    and means for driving the rudder in response to variations of the signal sum.

5. An autopilot system as defined in claim 4 and including also means manually actuable to reduce said relative attenuation of the first signal so that the relatively attenuated first signal at said limiting value of heading error is smaller than the second signal only at values of rudder deflection exceeding said maximum value.

6. An autopilot system as defined in claim 5 and including also control means actuated in accordance with the speed of the boat, and means controlled jointly by said manually actuable means and said control means and acting to produce a signal in response to actuation of said manually actuable means at cruising speed of the boat.

7. An autopilot system as defined in claim 4 and including also means actuable to reduce said relative attenuation of the first signal so that the relatively attenuated first signal at said limiting value of heading error is smaller than the second signal only at values of rudder deflection exceeding said maximum value,
    and means for actuating the last said means under automatic control in accordance with the speed of the boat.

8. An autopilot system for a boat, comprising in combination
    means for developing a signal voltage that represents the existing steering error,
    means for developing a reference voltage that equals the signal voltage when the steering error is zero,
    differential amplifier means for comparing the signal voltage and the reference voltage,
    and means acting under control of the amplifier means to drive the rudder of the boat in one direction when the signal voltage exceeds the reference voltage and in the other direction when the signal voltage is less than the reference voltage,
    and manually actuable means for varying the reference voltage to control the equilibrium rudder position.

9. An autopilot system for a boat, comprising in combination
    means for developing a signal voltage that represents the existing steering error,
    a source of electrical power having two terminals,
    two transistors having matched charcteristics and having respective bases, emitters and collectors,
    equal load impedance means connected between the respective collectors and one terminal,
    a common emitter impedance connected between the emitters and the other terminal,
    means for supplying the signal voltage to the base of one transistor,
    voltage dividing means connected between the two terminals,
    means for tapping from the voltage dividing means a reference voltage that equals the signal voltage for zero steering error and supplying the same to the base of the other transistor, the transistors conducting equal normal currents when the signal voltage equals the reference voltage,
    and means for driving the rudder in opposite directions in response to deviations of the current in the respective load impedances from said normal current.

10. An autopilot system for a boat, comprising in combination
    means for developing a signal voltage that represents the existing steering error,
    a source of electrical power having two terminals, two transistors having matched characteristics and having respective bases, emitters and collectors,
two relays having respective normally closed switches and having windings that are connected between the respective collectors and one terminal,
a common emitter impedance connected between the emitters and the other terminal,
circuit means for supplying the signal voltage to the base of one transistor,
circuit means for developing a reference voltage and for supplying the same to the base of the other transistor,
two power relays having respective windings, each winding being connected in series with one of said switches between the terminals of a power source, and reversible power means operatively coupled to the power relays for driving the rudder in opposite directions in response to actuation of the respective power relays.

References Cited in the file of this patent
UNITED STATES PATENTS

| | | |
|---|---|---|
| 2,387,795 | Isserstedt | Oct. 30, 1945 |
| 2,740,082 | Sedgfield | Mar. 27, 1956 |
| 2,764,370 | Yates | Sept. 25, 1956 |

UNITED STATES PATENT OFFICE
CERTIFICATE OF CORRECTION

Patent No. 3,140,436　　　　　　　　　　　　　　　　　July 7, 1964

William B. Hatch

It is hereby certified that error appears in the above numbered patent requiring correction and that the said Letters Patent should read as corrected below.

Column 2, line 42, for "and reliable representation of the actual rate of turn of" read -- damping of the water. I have discovered that it is pos- --.

Signed and sealed this 10th of August 1965.

(SEAL)
Attest:

ERNEST W. SWIDER
Attesting Officer

EDWARD J. BRENNER
Commissioner of Patents